United States Patent

Immel et al.

[15] 3,685,049

[45] Aug. 15, 1972

[54] INDICATOR LIGHT-RESISTOR MOUNTING ASSEMBLY

[72] Inventors: Ralph B. Immel; James D. Collins, both of Buffalo, N.Y.

[73] Assignee: Westinghouse Electric Corporation, Pittsburgh, Pa.

[22] Filed: March 25, 1970

[21] Appl. No.: 22,641

[52] U.S. Cl. ....................340/381, 317/99, 340/250, 340/252

[51] Int. Cl. ............................................G08b 21/00

[58] Field of Search.............340/253, 250, 381, 252; 240/1.3, 2.1, 8.16, 37.1; 317/99; 339/32, 33, 45 T; 174/52, 50

[56] References Cited

UNITED STATES PATENTS

| | | | |
|---|---|---|---|
| 1,871,748 | 8/1932 | Schramm | 340/381 |
| 1,664,228 | 3/1928 | Sparkes | 240/8.16 UX |
| 2,691,143 | 10/1954 | Lawson | 240/1.3 X |
| 2,002,251 | 5/1935 | Sinsiba et al. | 340/252 UX |
| 2,363,396 | 11/1944 | Carlson | 340/252 UX |

*Primary Examiner*—Thomas B. Habecker
*Assistant Examiner*—Daniel Myer
*Attorney*—F. H. Henson, C. F. Renz and A. S. Oddi

[57] ABSTRACT

An assembly adapted to receive a lamp, such as a neon indicating light, and a resistor, such as a current limiting resistor, to be connected in series with the light wherein a chamber is provided for securing the light herein and a separate insulating chamber is provided for the disposition of the resistor in such a fashion to provide electrical insulation therefor and wherein access is provided to the light and resistor for electrical connection to external circuitry.

7 Claims, 9 Drawing Figures

WITNESSES
*Helen M. Farkas*
*James F. Young*

INVENTOR
Ralph B. Immel &
James D. Collins
BY
*[signature]*
ATTORNEY

INDICATOR LIGHT-RESISTOR MOUNTING ASSEMBLY

BACKGROUND OF THE INVENTION

1. Field of the Invention:

The present invention relates to assemblies for mounting electrical components and, more particularly, to such assemblies for providing electrical insulation between components and for protecting against damage due to mechanical vibrations.

2. Discussion of the Prior Art

In high power apparatus employing semiconductor devices, such as rectification equipment including high power diodes or thyristors, it is desirable to monitor each of the power semiconductor devices and to provide an indication if a device should fail so that corrective action can be taken when convenient. One technique for monitoring each power device is to connect an indicator device in parallel with the main power fuse which is connected in series with the semiconductor device being monitored. The most commonly used types of indicating devices are trigger fuses and neon lights, the latter being more economical when a remote indication of device failure is not required and sufficient voltage is available to exceed the threshold of the neon light. Upon the failure of a semiconductor power device by shorting, the associated main power fuse blows thereby inserting the indicating device in series with the operating source and the shorted power device. When a neon light is employed it is necessary that a current limiting resistor be connected in series therewith to prevent destruction of the light when its threshold voltage is exceeded. The most straight-forward method of mounting a current limiting resistor is merely to electrically connect it between one terminal of the neon light and the associated fuse, relying upon the mechanical strength of the leads of the resistor to support it. This, however, has not proved to be a satisfactory solution since vibrations, due to for example the 60 Hz oscillation of the electrical source or other external mechanical shock or vibration, eventually caused the leads to break due to the repeated flexing thereof. To avoid this flexing it became necessary to secure the body of the resistor to a mounting surface with a mounting clip comprised of an insulating material. The requirement for an insulated clip increases the number of manufacturing steps with the electrical leads of the resistor still being exposed resulting in a possible safety hazard to personnel during servicing operations.

SUMMARY OF THE PRESENT INVENTION

Broadly, the present invention provides a unitary assembly for receiving both a light and a resistor which are electrically insulated from one another and with the resistor being mounted in a secured manner to avoid damage due to vibrations thereof.

DESCRIPTION OF THE PREFERRED EMBODIMENT

Figure 1:
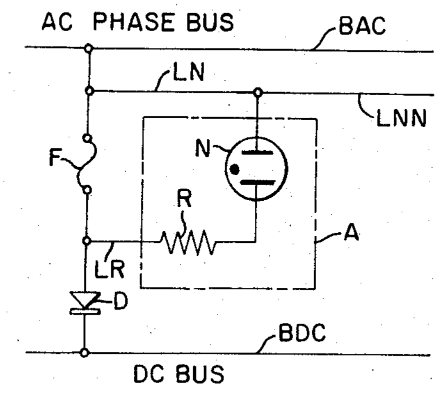
FIG. 1 is a schematic diagram showing an electrical configuration in which the components of the present invention may be connected.

FIG. 1 shows a schematic of a possible electrical configuration in which the assembly of the present invention can be employed. In FIG. 1 an AC phase bus BAC supplies a single phase or, for example, a polyphase, 60 Hz, AC source to be applied for rectification in a diode D which may comprise a high power silicon diode. A fuse F is connected between the AC phase bus BAC and the anode of the diode D with the cathode of the diode D being connected to a DC bus BDC. The fuse F comprises the main power fuse for that particular leg of the rectification equipment. When the diode D fails by shorting, the fuse F will blow thereby open circuiting the path to the anode of the diode D. A neon light N, connected in series with a current limiting resistor R, is connected directly across the fuse F. One terminal of the neon light N is connected via an electrical conductor LN to the AC phase bus BAC at the top end of the fuse F. The other terminal of the neon light N is connected to one lead of the resistor R, and the other lead LR is connected to the bottom end of the fuse F at the anode of the diode D. An electrical lead LNN forms a common connection with the lead LN. The lead LNN serves as a common connection to which one terminal of other neon lights monitoring power diodes connected in parallel to the diode D may be connected.

When the fuse F blows the neon light N will be connected between the AC phase bus BAC, and the DC bus BDC. The neon be N is so selected that its threshold voltage will be exceeded so that it will become illuminated providing an indication that the diode D has failed by shorting. The resistor R is selected to have sufficient resistance to limit the current through the neon light N to within the rating thereof. The neon light N and the resistor R are shown in FIG. 1 to be enclosed by a dotted block A which schematically indicates the assembly of the present invention.

Figure 2:
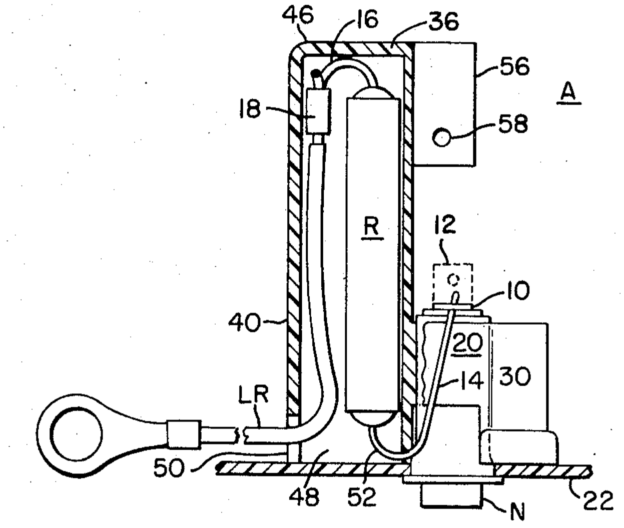
FIG. 2 is a sectional view of the present invention.

Referring now to FIG. 2 assembly A of the present invention is shown with the neon light N and the resistor R mounted therein. The neon light N may, for example, comprise a standard neon light such as is supplied by Leecraft Manufacturing Company, under the designation 3200X. Such a neon light has a substantially cylindrical body comprising a plastic material of a predetermined diameter. Electrical connections are made to the light N through a pair of male terminals 10 and 12 which extend from the back portion of the light. In FIG. 2 the terminal 10 is shown bent over 90° to receive a lead 14 in a hole therein from one end of the resistor R. The lead 14 would be secured to the terminal 10 by soldering. The terminal 12 would be connected via the electrical conductor LN as shown in FIG. 1.

The resistor R may comprise any standard resistor having a substantially tubular shape and may have a resistance value of for example, 1.8 megohms. The other lead 16 of the resistor R is electrically connected to the electrical conductor LR, which has an insulating sheath therearound, by a splicing terminal 18. The insulated conductor LR may then be connected as shown in FIG. 1 to the anode of the diode D at the bottom end of the fuse F.

Referring also to FIGS. 3A, 3B, 3C and 3D along with FIG. 2, the assembly A comprises a unitary structure molded from a flexible insulating material, such as, polypropylene, nylon or other equivalent flexible insulating material. The assembly A includes a first light receiving chamber 20 of a substantially tubular shape wherein as shown in FIG. 2 the light N is disposed. As shown in FIG. 2 the light N is disposed through an insulating cover member 22 into the chamber 20 with the terminals 10 and 12 extending out of the back of the chamber 20 which has a front aperture 24, a back aperture 26 and a nominal diameter 28. Contiguous to the first light receiving chamber 20 is a second light receiving chamber 30. The chamber 30 has a substantially tubular shape and is somewhat longer in the longitudinal direction than the chamber 20 and of a somewhat smaller diameter 32. A slot 34 is defined between the two chambers 20 and 30, with substantially circular cross sections being defined across both chambers. The second chamber 30 is adapted to receive a neon light of a smaller diameter and of a somewhat different shape than the neon light N, such as supplied by Drake Manufacturing Company, under the number designation 6073-001-634. Thus the assembly including the chambers 20 and 30 is adapted to receive different types of neon lights at the nominal material expense required in molding the assembly. The chamber 30 is open at the front thereof to receive a neon light and is open at the back to provide access to the terminals thereof.

The diameter 28 of the chamber 20 is selected to be of a slightly smaller diameter than the neon light N. For example, the diameter 28 may be 100th of an inch smaller than that of the outside diameter of the neon bulb N as described above. With the slot 34 being defined between the chambers 20 and 30 and the assembly being molded of a flexible material the neon bulb N may be pushed into the front aperture 24 of the chamber 20 with the size of the chamber slightly increasing to accommodate the neon light N. The neon light N will thus be snugly held in place by the resistance or spring force exerted by the somewhat expanded chamber 20. If the chamber 30 were utilized to accommodate that smaller type of neon light, the same secure fit would be provided due to the flexible material utilized and the slot 34 permitting the slight expansion of the chamber 30.

Contiguous to the first light receiving chamber 20 is a resistor receiving chamber 36 of a substantially tubular shape having a predetermined diameter 38. A lead receiving chamber 40 of a smaller diameter 42 than the diameter 38 forms a singular cavity with the chamber 36 with a channel 44 being provided between the two chambers. The cavity including the chambers 36 and 38 is closed at an end portion 46 with an aperture 48 being provided at the other end of the cavity.

The resistor R is disposed in the chamber 36 prior to the disposition of the cover member 22, as shown in FIG. 2, with the lead 16 thereof adjacent to the closed end 46 thereof. The diameter 38 of the chamber 36 is selected to be sufficient to accommodate the diameter of the resistor R. However the diameter 42 of the chamber 40 is selected to not be large enough to receive the body of the resistor R. The lead 16 of the resistor R is bent around and the insulated conductor LR, connected to the lead 16 via the splicing terminal 18, passes out through the chamber 40. The diameter 42 of the chamber 40 is selected to be sufficiently large enough to accommodate the insulated lead LR. The unconnected end of the insulated lead LR passes through a cutaway portion 50 in the side wall of the chamber 40 extending from the aperture 42 thereof. The cover member 22, as shown in FIG. 2, closes the opening 50 with the conductor LR being enclosed thereby in the final assembly.

The other lead 14 of the resistor R, at the aperture end 48 of the chamber 36, is passed through a slot 52 cut into the top side wall of the chamber 36 adjacent to the light receiving chamber 20. A similar slot 54 on the bottom side of the side wall of the chamber 36 is also provided. The slots 52 and 54 extend into the side wall of the chamber 36 a slightly greater distance than the point at which the front aperture 24 of the chamber 20 begins. The lead 14 of the resistor R is thus passed through the slot 52 (or alternately through the slot 54) and bent rearwardly toward the terminal 10 of the light N. The end of the lead 14 is passed through a hole in the terminal 10 which has been previously bent over 90° and the lead soldered thereto. In final assembly, the light N is thus prevented from being removed from the light receiving aperture 20 thereby.

The cover member 22 disposed over the aperture 48 of the chambers 36 and 40 enclose the resistor R therein so that the resistor R is held in position to prevent vibrations from being destructive to leads 14 and 16. Moreover, the lead 16 connected via the splicing terminal 18 to the insulated lead LR is disposed near the back portion 46 of the chambers 36 and 40 and is thus more than adequately insulated and shielded from the lead 14 and the terminals 10 and 12 of the light N.

Figure 3C:
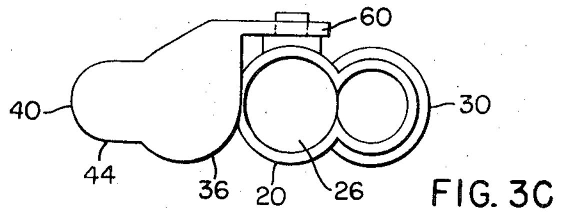
FIGS. 3A, 3B, 3C and 3D are top, front, back and side view of the assembly of the present invention, respectively.
Figure 3D:
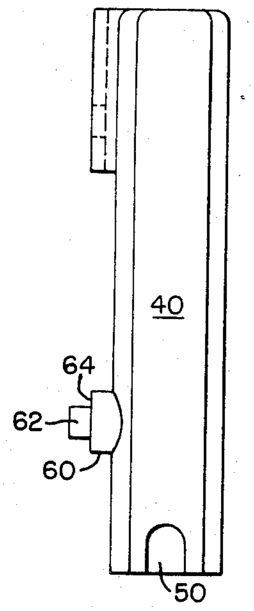
Figure 3A:
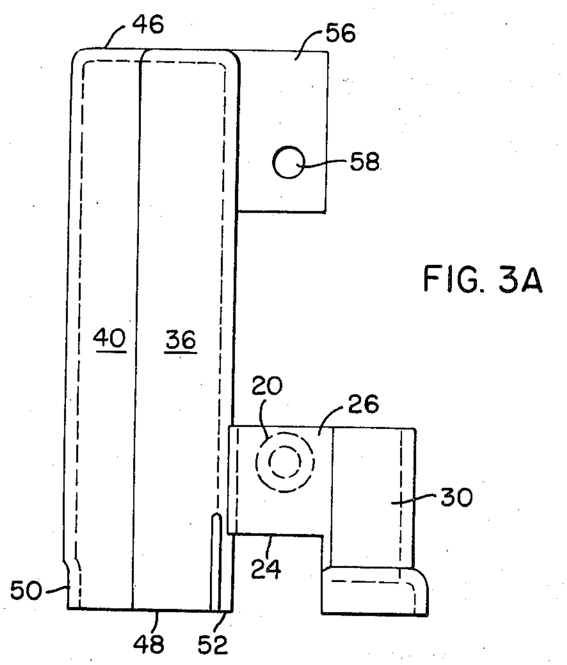
Figure 3B:
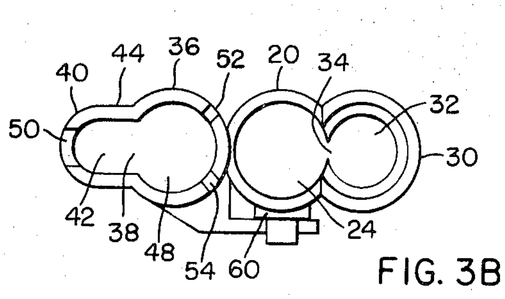

As better shown in FIG. 2 and FIG. 3A, the assembly A is provided with a tab portion 56 which is an integral part of the assembly. The tab portion 56 is contiguous to the rearward portion of the chamber 38 at the side adjacent to the light receiving chamber 20. A hole 58 is provided in the tab portion 56 so that the assembly may be secured to a mounting surface by a fastening device, such as a bolt. Also included in the assembly is a dowel portion 60, better shown in FIGS. 3B, 3C and 3D. The dowel portion 60 includes a stud portion 62 which extends from a larger diameter stop portion 64. The stud portion 62 may be inserted into a hole of suitable diameter in a mounting surface so that the assembly will rest against the stop portion 62. The dowel portion 60 of the assembly thus prevents lateral movement of the assembly which may then be secured in place by a fastening device through the hole 58 in the tab portion 56.

Figure 4:
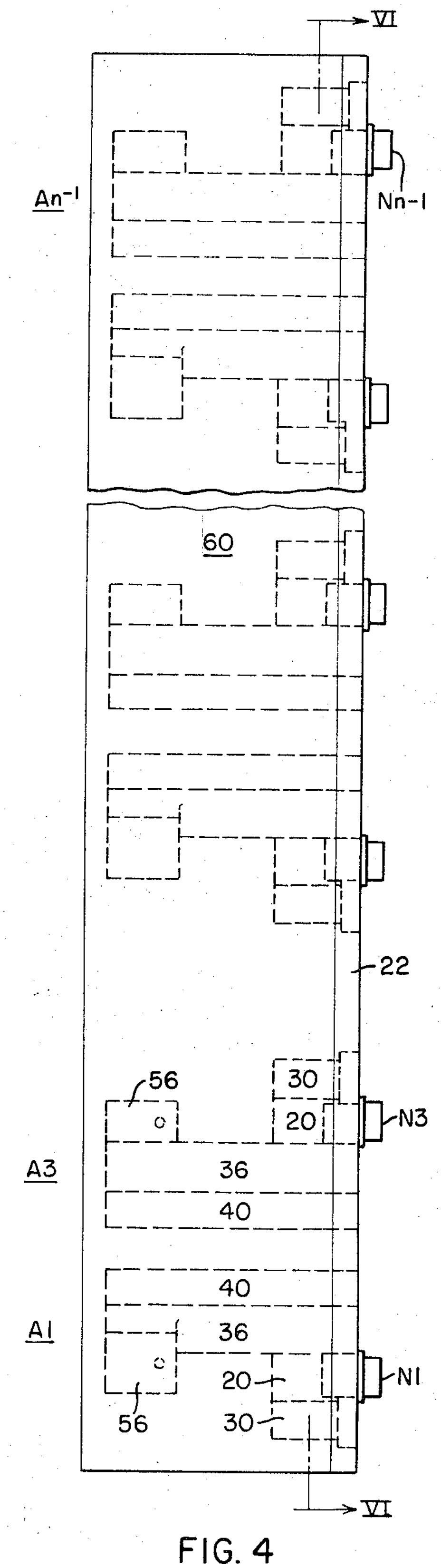
FIG. 4 is a top view of a panel employing a plurality of assemblies.
Figure 5:
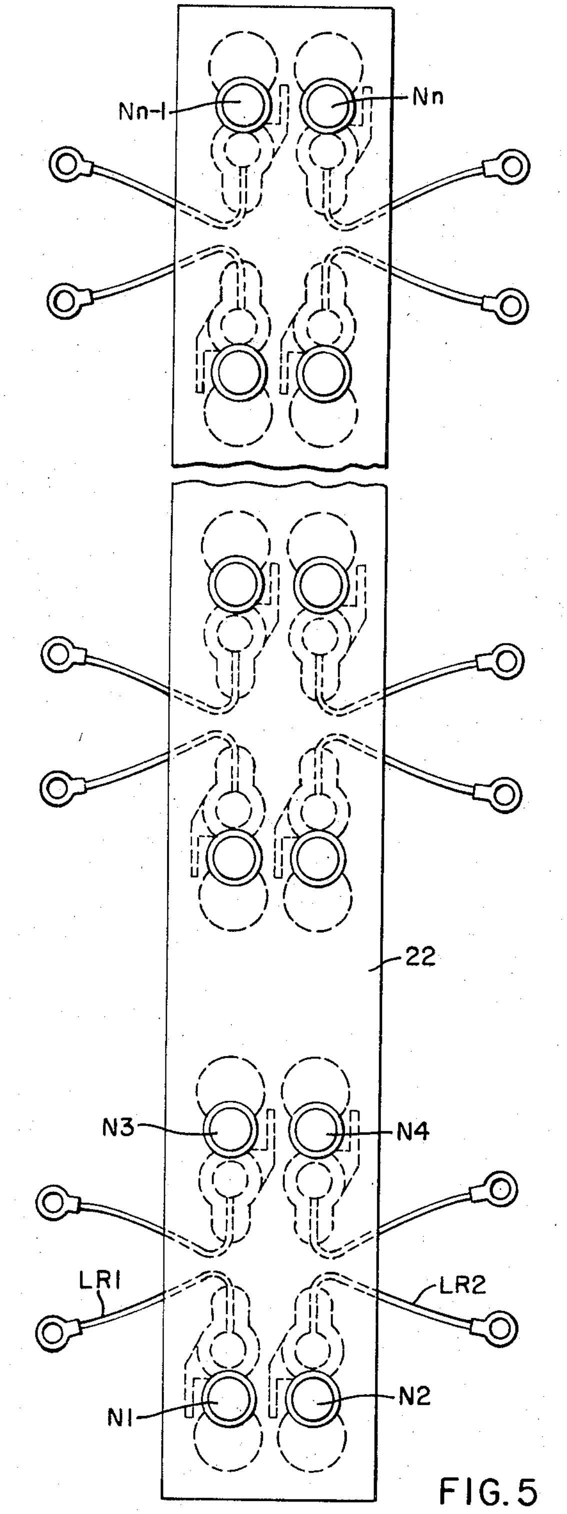
FIG. 5 is a front view of FIG. 4.
Figure 6:
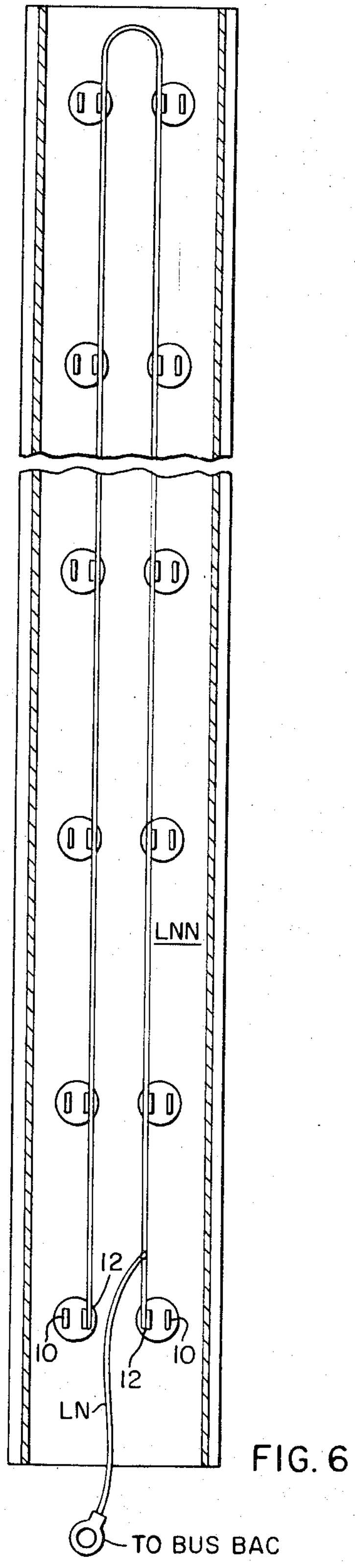
FIG. 6 is a sectional view along line VI-VI of FIG. 4.

FIGS. 4, 5 and 6 show a plurality of assemblies A*1*–A*n* wherein a plurality of neon lights N*1*–N*n* may be connected in a panel array wherein each of the individual neon lights will monitor a separate power diode, for example. The panel shown in FIGS. 4, 5 and 6 includes a wiring channel 60 wherein the plurality of assemblies are secured. For the purposes of spacing respective chambers 40, adjacent assemblies may be disposed adjacent one another as shown in FIG. 4. With the assemblies so disposed as shown, in each of the assemblies, the resistor R with the lead LR secured by the splicing terminal is inserted into the chamber 36 with the lead LR passing out of the aperture 50 in the side wall of the chamber 40. The front lead 14 of the resistor R is passed through one of the slots 52 or 54 and bent backwardly toward the back aperture 26 of the light receiving chamber 20. The cover member 22 is disposed over the front of the panel and includes apertures therein which align with the respective front apertures 24 of the light receiving chambers 20. The neon lights N*1*–N*n* are disposed in the respective light receiving chambers 20. The lead 14 of the resistor R is then secured to the terminal 10 of each of the neon lights as better shown in FIG. 2.

As shown in FIG. 5 the respective insulated conductors LR1 and LR2 for the neon lights N1 and N2 may then be connected to the respective anode electrodes of the power diodes being monitored. The other neon lights would similarly be connected to respective power diodes being monitored.

The terminal 12 of each of the neon lights N*1* and N*n* are to be commonly connected to the AC phase bus BAC such as shown in FIG. 1. Thus, a bare wire LNN as shown in FIG. 6, is commonly connected to the terminals 12 of each of the neon lights N*1*–N*n*. The bare wire LNN may be secured to the terminals 12 by a suitable push-on terminal clip. The conductor LN as shown in FIG. 6 and in FIG. 1 is then connected between the bare wire LNN and the AC phase bus BAC.

The panel will thus present an array of indicator lights as shown in FIG. 5. When any of the lights N*1*–N*n* become illuminated this indicative of a failure by shorting of the particular power diode and blowing of the power fuse being monitored thereby. The panel array thus as shown in FIGS. 4, 5 and 6 provides a compact arrangement through the use of the assembly provided herein for mounting and securing the individual neon lights and associated current limiting resistors. The panel array as shown in FIGS. 4, 5 and 6 may be assembled at a separate location from the power equipment and, in the final assembly process, the respective connections from the panel to the power diodes being monitored and to the AC phase bus may then be made.

We claims:

1. An indicator assembly comprising an insulating housing, said housing comprising a pair of side-by-side chamber portions formed integral therewith, a first of said chamber portions having an open front, a light supported in said first chamber portion at said open front, a pair of terminals connected to said light at the back of said first chamber portion, a resistor supported in the second of said chamber portions, a pair of leads connected to said resistor, one of said leads being connected to one of said terminals and the other of said leads being accessible for connection to external means, said pair of leads being so disposed within said second chamber portion that they are electrically insulated from one another.

2. The indicator assembly of claim 10 wherein:

said first chamber portion comprises first substantially tubular portion with a first aperture at one end thereof for receiving said light and a second aperture at the other end thereof for providing access to said pair of terminals, said first tubular portion having a slot running along the longitudinal dimension thereof so that it is resilient for securing said light therein.

3. The indicator assembly of claim 2 wherein:

said first chamber portion includes a second substantially tubular portion contiguous to said first tubular portion and having a different diameter so as to be adapted to receive and to secure a different size light from said first tubular portion.

4. The indicator assembly of claim 3 wherein:

said slot is common to said first and second tubular portions of said first chamber portion so that either said first tubular portion or said second tubular portion will be resilient to secure the respective size light therein.

5. The indicator assembly of claim 1 wherein:

said second chamber portion includes a first substantially tubular portion having an aperture at one end thereof for receiving said resistor and being closed at the other end thereof, the end of said resistor connected to said other lead being disposed adjacent said closed end and said other lead extending from said first tubular portion of said second chamber portion.

6. The indicator assembly of claim 5 wherein:

said second chamber portion includes a second substantially tubular portion contiguous to said first tubular portion and having a common aperture at one end thereof and being closed at the other end thereof and having a common longitudinal channel therebetween;

said other lead is electrically insulated and extends from said closed end and through said common channel and out from said second tubular portion through said common aperture to be connected to said external means.

7. The indicator assembly of claim 4 wherein:

said second chamber portion includes a first substantially tubular portion having an aperture at one end thereof for receiving said resistor and being closed at the other end thereof, the end of said resistor connected to said other lead being disposed adjacent said closed end and said other lead extending from said first tubular portion of said second chamber portion.

* * * * *